(12) United States Patent
Chandhoke

(10) Patent No.: US 7,103,424 B2
(45) Date of Patent: Sep. 5, 2006

(54) RE-CONFIGURABLE MOTION CONTROLLER DRIVE

(75) Inventor: Sundeep Chandhoke, Austin, TX (US)

(73) Assignee: National Instruments Corporation, Austin, TX (US)

(*) Notice: Subject to any disclaimer, the term of this patent is extended or adjusted under 35 U.S.C. 154(b) by 533 days.

(21) Appl. No.: 10/653,532

(22) Filed: Sep. 2, 2003

(65) Prior Publication Data
US 2005/0049724 A1    Mar. 3, 2005

(51) Int. Cl.
*G06N 5/00*    (2006.01)
(52) U.S. Cl. .............................. 700/56; 700/1
(58) Field of Classification Search ................ 700/56, 700/1, 79
See application file for complete search history.

(56) References Cited

U.S. PATENT DOCUMENTS

| | | | |
|---|---|---|---|
| 6,084,373 A * | 7/2000 | Goldenberg et al. ... | 318/568.11 |
| 6,259,221 B1 | 7/2001 | Yutkowitz | |
| 6,360,277 B1 | 3/2002 | Ruckley et al. | |
| 6,473,660 B1 * | 10/2002 | Thibault ....................... | 700/79 |
| 6,788,980 B1 * | 9/2004 | Johnson ......................... | 700/1 |
| 6,823,221 B1 | 11/2004 | Peck et al. | |
| 2003/0046380 A1 | 3/2003 | Steger et al. | |

FOREIGN PATENT DOCUMENTS

EP    0965417    12/1999

* cited by examiner

*Primary Examiner*—Wilbert L. Starks, Jr.
(74) *Attorney, Agent, or Firm*—Meyertons Hood Kivlin Kowert & Goetzel, P.C.; Jeffrey C. Hood (57) ABSTRACT

A motion control system and method for configuring a motion controller drive. The system may comprise a motion controller coupled through a digital communication link to the motion controller drive. The motion controller drive includes a reconfigurable portion that is configurable with, for example, different communication protocols for communication with different motion controllers.

28 Claims, 5 Drawing Sheets

RE-CONFIGURABLE MOTION CONTROLLER DRIVE

BACKGROUND OF THE INVENTION

1. Field of the Invention

This invention relates to motion controllers, and more particularly, to re-configurable drives in a motion controller system.

2. Description of the Related Art

Automated motion control involves precisely controlling the movement of a device or system. Automated motion control is widely used in many different types of applications, including applications in the fields of industrial automation, process control, test and measurement, robotics, and integrated machine vision, among others. A typical automated motion system includes components such as the moving mechanical device(s), a motor with feedback and motion I/O, a motor drive unit, a motion controller, and software to interact with the motion controller.

The motor is commonly a stepper motor or a servo motor. Stepper motors are discrete motion devices that move to positions that relate directly to the number of input control pulses, at a velocity that relates directly to the pulse rate. Servo motors are continuous motion devices that use feedback signals to provide position and velocity control in a closed-loop environment. Motors typically have many wire coils oriented in specific magnetic positions within their housing. By pulsing or steadily controlling current through different motor coils in a known pattern, electromagnetic fields develop in the motor, causing incremental or continuous motion.

The motion controller is often a motion control plug-in board that is connected to an expansion slot or bus of a computer system. The motion controller generates control signals to control the motor and may have various processing components, such as a CPU, DSP, and/or FPGA for performing tasks related to the motion control. A motor drive is typically located between the motion controller and the motor. Motor drive power devices convert the control signals generated by the motion controller into power signals that are provided to the motor connected to the drive.

Communications between the motion controller and the drive are often disrupted when a drive is swapped or a motion controller is replaced. This disruption often requires undesirable reprogramming of the motion controller system because the drive is typically fixed in its communication settings and is not configurable beyond its initial factory communication settings.

Figure 1A:
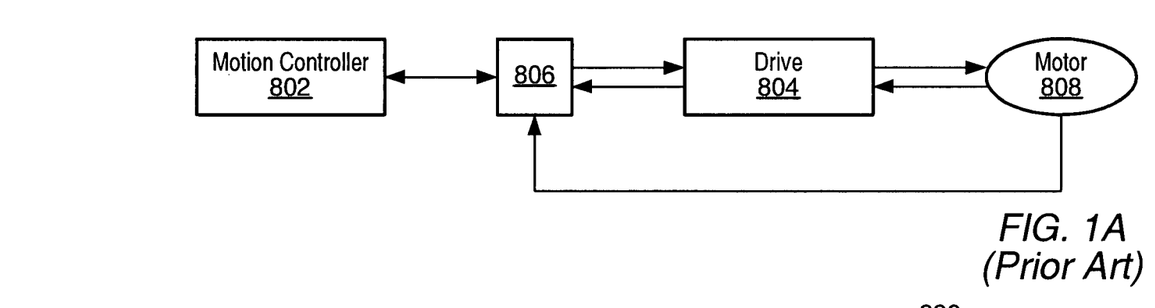
FIG. 1A illustrates a block diagram of a prior art motion controller and drive system that uses a breakout box for communications therebetween.

FIG. 1A illustrates a block diagram of a prior art motion controller 802 and drive system 804 that uses a breakout box 806 for communications therebetween. The motion controller 802 includes all the digital and analog I/O built into it. This configuration necessitates use of the breakout box 806 for at least the reason that the motion controller 802 and the drive 804 communicate across an analog cable. Also illustrated is a motor 808 that is to be controlled by the motion controller 802. To accommodate appropriate signal adjustment in the system, the motor 808 supplies feedback signals to the drive 804 which enable the drive 804 to indicate to the breakout box 806 the current condition of the motor 808. In some embodiments, the feedback from the motor 808 may travel directly from the motor 808 to the breakout box 806 or even pass through the breakout box 806 directly to the motion controller 802.

Figure 1B:
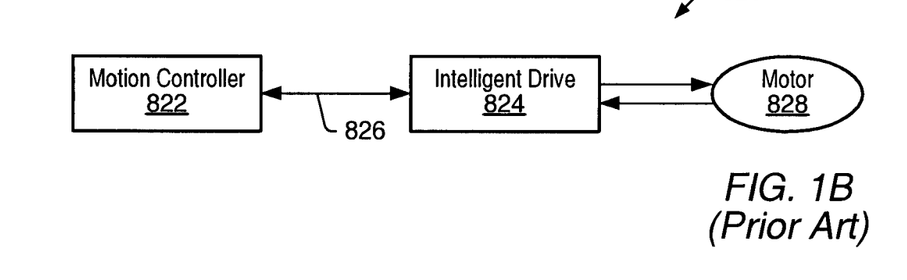
FIG. 1B illustrates a block diagram of another prior art distributed motion controller system.

FIG. 1B illustrates a block diagram of a prior art distributed motion controller system 820. A motion controller 822 is illustrated with an intelligent drive 824 that is connected via a digital bus 826. The digital bus 826 is deterministic and the digital and analog I/O is built into the intelligent drive 824. In this type of a system, multiple drives may be daisy chained together. A motor 828 is illustrated having feedback to the intelligent drive 824. The feedback, similar to the FIG. 1A embodiment, supports adjustments in signals that are sent from the motion controller 822 to accommodate changing motor requirements. However, the motion controller system 820 introduces new problems such as the communication protocol between the motion controller 822 and the intelligent drive 824. As motion controller manufacturers and drive manufacturers have traditionally been separate entities having different expertise, there is no communication protocol standard with which everyone agrees. This has resulted in the conventional motion system of FIG. 1A to still be the most popular option.

Many other problems and disadvantages of the prior art will become apparent to one skilled in the art after comparing such prior art with the present invention as described herein.

SUMMARY

Various aspects of the present invention are realized through a motion control system and method for configuring a motion controller drive. The system may comprise a motion controller coupled through a digital communication link to the motion controller drive. The motion controller drive includes a reconfigurable portion that is configurable with, for example, different communication protocols. The motion controller drive also may include drive logic for controlling a motor in response to signals received from the reconfigurable portion.

The method may involve downloading a first program to the motion controller drive. The first program may be downloaded by the motion controller or by a separate server. The first program is operable to configure the reconfigurable portion of the motion controller drive according to a first motion controller communication protocol. A first motion controller communicates with the motion controller drive according to the first motion controller communication protocol. The reconfigurable portion of the motion controller drive may operate to execute the first program to process the first communication signals. The motion controller drive may be operable to control a motor in response to executing the first program.

At a later time, the first motion controller may be replaced with a second motion controller that utilizes a second motion controller communication protocol. The method may then include downloading a second program to the reconfigurable portion of the motion controller drive. The second program is operable to configure the reconfigurable portion of the motion controller drive according to the second motion controller communication protocol. The second motion controller then communicates with the motion controller drive according to the second motion controller communication protocol. The motion controller drive receives the second communication signals and the reconfigurable portion of the motion controller drive executes the second program to process the second communication signals such that the motion controller drive is operable to control a motor in response to executing the second program.

The reconfigurable portion of the drive may be a programmable hardware element, a processor and memory medium, or a combination of the programmable hardware element and the processor and memory. The motion controller drive is then reconfigurable to operate with different motion controllers using different motion controller communication protocols. In certain embodiments, the reconfigurable portion of the motion controller drive includes one or more field programmable arrays (FPGAs) that may be programmed to communicate with different motion controllers. The reconfigurable portion of the motion controller drive may also, or instead, include at least one processor that may be programmed to communicate with different motion controllers. The reconfigurable portion typically performs processing and translation of communication signals from the motion controller. In some embodiments, the motion controller may be implemented in software on a host computer. In other embodiments, a host computer may communicate with the motion controller via ethernet to control a device across the digital communication link. The motion controller drive may sometimes receive feedback from a controlled device.

Other aspects of the present invention are realized in another method for configuring a motion controller drive in a system with a motion controller coupled through a digital communication link to the motion controller drive. In this embodiment, a motion controller communicates signals to the motion controller drive according to a first motion controller communication protocol. It is then determined whether the motion controller drive can understand the first motion controller communication protocol. If the motion controller drive cannot understand the first motion controller communication protocol, then a first program is downloaded to a reconfigurable portion of the motion controller drive. The first program corresponds to the first motion controller communication protocol. The motion controller drive may then execute the first program to enable the motion controller drive to understand the first motion controller communication protocol.

In one embodiment, when the user connects a motion controller to a motion controller drive, the motion controller (and/or the drive) may determine if they use the same motion controller communication protocol. If not, the motion controller or a separate server may download a new motion controller communication protocol to the motion controller drive to enable the motion controller drive to understand the communication protocol used by the motion controller.

In another embodiment, a motion controller drive is built according to certain but not other principles of the present invention. The motion controller drive includes an input for receiving communication signals from a motion controller. The communication signals correspond to a respective motion controller communication protocol. The drive also includes a reconfigurable portion coupled to the input. Thus, the reconfigurable portion is configurable to process received communication signals according to different motion controller communication protocols during different periods of time.

Other aspects of the present invention will become apparent with further reference to the drawings and specification which follow.

BRIEF DESCRIPTION OF THE DRAWINGS

Other aspects of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling within the spirit and scope of the present invention as defined by the appended claims.

DETAILED DESCRIPTION OF THE DRAWINGS

Figure 2:
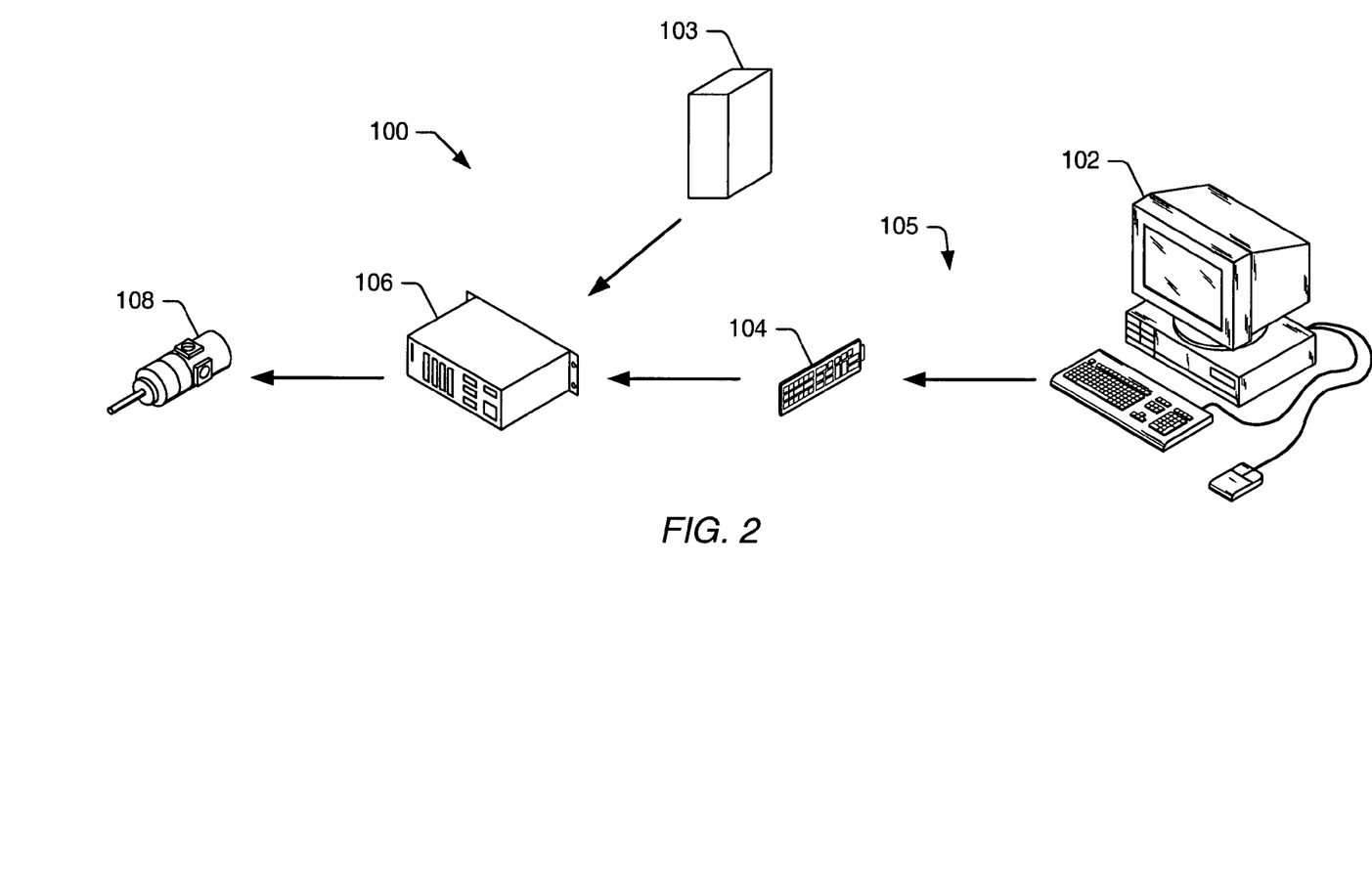
FIG. 2 illustrates a motion controller system according to certain but not other aspects of the present invention.

FIG. 2 illustrates a motion controller system 100 according to one embodiment of the present invention. In the illustrated embodiment, a computer system 102 is illustrated for controlling operations in the motion controller system 100 through a motion controller card 104 and motion controller drive 106. The motion controller drive 106 is coupled to a motor 108 to complete the motion controller system 100. The computer system 102 operating in conjunction with the motion controller card 104 may be referred to as a "motion controller" 105. The motion controller card 104 may be, for example, a low cost 7334 Series Stepper Controller or a high performance 7344 Series, both products of National Instruments.

The computer system 102 may be any type of computer system, including a personal computer system, mainframe computer system, workstation, network appliance, Internet appliance, personal digital assistant (PDA), television system or other device. In general, the term "computer system" can be broadly defined to encompass any device having at least one processor that executes instructions from a memory medium.

The computer system 102 may include a memory medium(s) on which one or more computer programs or software components may be stored according to one embodiment of the present invention. For example, the memory medium may store an application development environment, such as a motion control prototyping environment application (or portion of such an application) for creating motion control programs. The memory medium may store one or more sequences created for the motion controller system 100, and/or store one or more software programs, including graphical programs and/or text-based programs usable by the motion controller system 100. The memory medium may also store one or more of the software programs executable to download programs to the motion controller drive 106 to configure the motion controller drive 106 according to a motion controller communication protocol. In one embodiment, a separate server 103 may be used to download programs to the motion controller drive 106 to configure the motion controller drive 106. The memory medium may also store operating system software, as well as other software for operation of the computer system 102.

The term "memory medium" is intended to include an installation medium, e.g., a CD-ROM, floppy disks, or tape device; a computer system memory or random access memory such as DRAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution.

The term "Programmable Hardware Element" is intended to include various types of programmable hardware, reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDs) or one or more Complex PLDs (CPLDs), or other types of programmable hardware. A programmable hardware element may also be referred to as "reconfigurable logic". A programmable hardware element may be configured using a hardware configuration program.

The term "program" is intended to have the full breadth of its ordinary meaning. The term "program" includes 1) a software program which may be stored in a memory and is executable by a processor or 2) a hardware configuration program useable for configuring a programmable hardware element.

The term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

The term "hardware configuration program" is intended to include a netlist, bit file, or other type of program or data structure that can be used to program or configure a programmable hardware element.

The term "graphical program" or "block diagram" is intended to include a program comprising graphical code, e.g., two or more interconnected nodes or icons, wherein the interconnected nodes or icons may visually indicate the functionality of the program. The nodes may be connected in one or more of a data flow, control flow, and/or execution flow format. The nodes may also be connected in a "signal flow" format, which is a subset of data flow. Thus the terms "graphical program" or "block diagram" are each intended to include a program comprising a plurality of interconnected nodes or icons which visually indicate the functionality of the program.

A graphical program may also comprise a graphical user interface or front panel. The user interface portion may be contained in the block diagram or may be contained in one or more separate panels or windows. The user interface of a graphical program may include various graphical user interface elements or front panel objects, such as user interface controls and/or indicators, that represent or display the respective input and/or output that will be used by the graphical program, and may include other icons which represent devices being controlled. The user interface or front panel may be comprised in a single window of user interface elements, or may comprise a plurality of individual windows each having one or more user interface elements, wherein the individual windows may optionally be tiled together. As another example, the user interface or front panel may comprise user interface or front panel objects, e.g., the GUI, embedded in the block diagram. The user interface of a graphical program may display only output, only input, or both input and output. Further, in some embodiments the user interface or front panel of a graphical program may enable the user to interactively control or manipulate the input being provided to the graphical program.

Examples of graphical programming development environments that may be used to create and/or execute graphical programs include LabVIEW, DasyLab, and DiaDem from National Instruments, VEE from Agilent, WiT from Coreco, Vision Program Manager from PPT Vision, SoftWIRE from Measurement Computing, Simulink from the MathWorks, Sanscript from Northwoods Software, Khoros from Khoral Research, SnapMaster from HEM Data, VisSim from Visual Solutions, ObjectBench by SES (Scientific and Engineering Software), and VisiDAQ from Advantech, among others.

Figure 3:
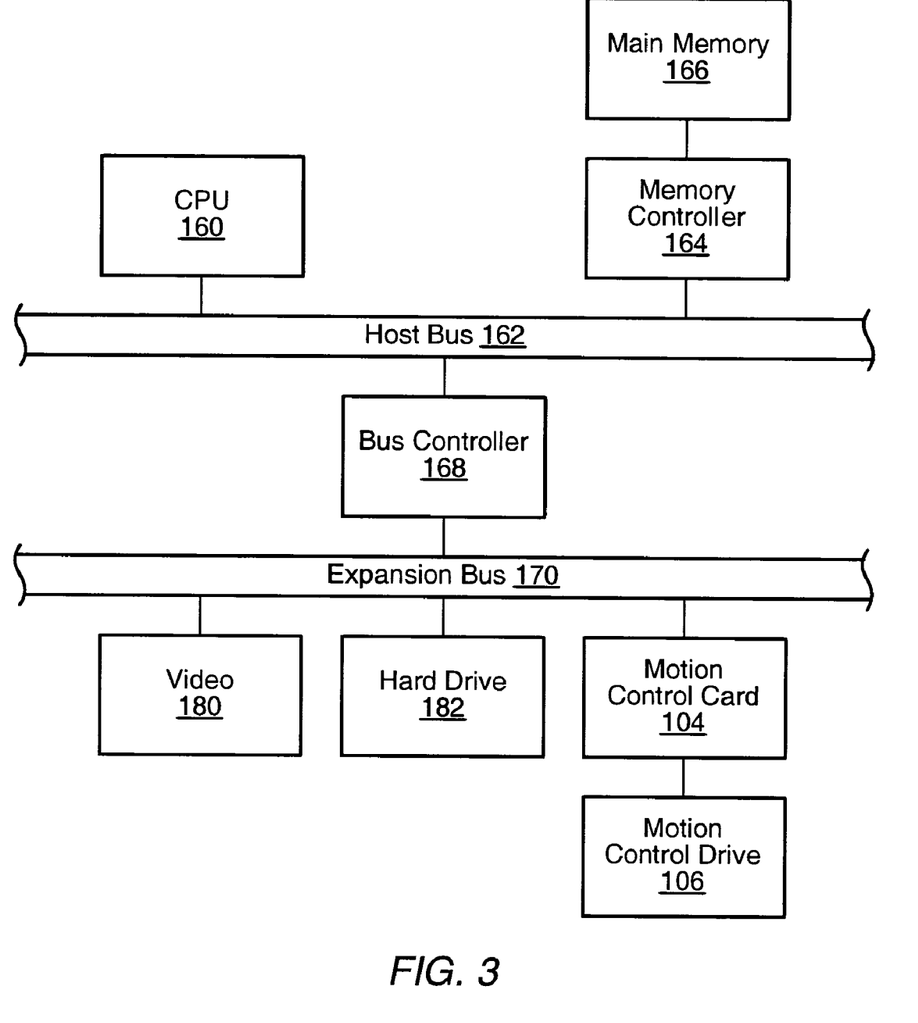
FIG. 3 is a block diagram representing one embodiment of the computer system illustrated in FIG. 2.

FIG. 3 is a block diagram representing one embodiment of the computer system 102. It is noted that any type of computer system configuration or architecture can be used as desired, and FIG. 3 illustrates a representative PC embodiment. It is also noted that the computer system 102 may be a general purpose computer system, a computer implemented on a VXI card installed in a VXI chassis, a computer implemented on a PXI card installed in a PXI chassis, or other types of embodiments. Elements of a computer not necessary to understand the present description have been omitted for simplicity.

The computer system 102 may include at least one central processing unit or CPU 160 which is coupled to a processor or host bus 162. The CPU 160 may be any of various types, including an x86 processor, e.g., a Pentium class, a PowerPC processor, a CPU from the SPARC family of RISC processors, as well as others. Main memory 166 is coupled to the host bus 162 by means of memory controller 164. In one embodiment, the main memory 166 may store a motion control prototyping environment application for graphically creating, configuring, simulating, and/or performing a sequence of motion control operations (or MC/MV/DAQ operations). The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as the motion control drive 106 and the motion control card 104. The computer system 102 further comprises a video display subsystem 180 and hard drive 182 coupled to the expansion bus 170.

Figure 4:
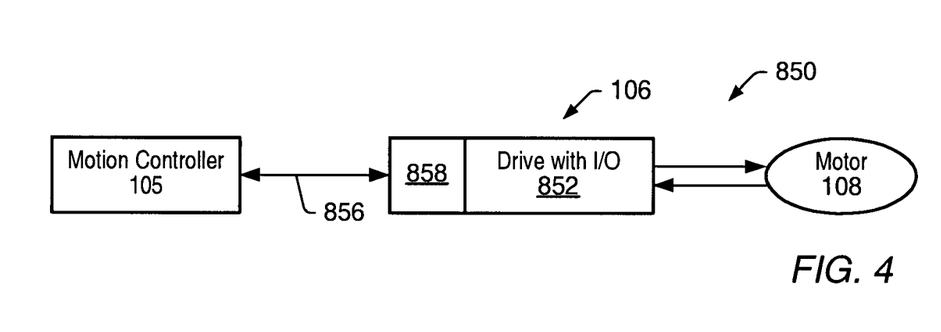
FIG. 4 illustrates a block diagram of an exemplary distributed motion control system embodiment that includes a re-configurable drive in accordance with certain but not other principles of the present invention.

FIG. 4 illustrates a block diagram of an exemplary distributed motion control system 850 having a re-configurable drive 106 in accordance with certain but not other principles of the present invention. A motion controller 105 is illustrated that communicates with the re-configurable drive 106 across a digital bus 856 (or network). The re-configurable drive 106 includes a front end 858 that serves as the interface between communication signals that are received at a drive I/O 852 from the digital bus 856. The front end 858 may be programmed to meet protocol requirements that are introduced by the motion controller 105 when the motion controller 105 produces communication signals to control the motor 108. These communication signals meet a specific protocol requirement to travel on the digital bus 856. The front end 858 is configured to communicate with the motion controller 105 protocol and receives the communication signals for the drive I/O 852. The drive I/O 852 includes I/O that is typically of a fixed nature. However, the front end 858 may include FPGAs (Field Programmable Gate Arrays), DSPs (Digital Signal Processors), memories, and/or other programmable hardware elements that may be programmed to meet the protocol requirements of the motion controller 105.

The re-configurable drive 106 allows multiple motion controllers 105 to communicate with the same drive I/O 852 by configuring the front end 858 to meet the protocol requirements of the motion controller 105 that is desired to be used in the motion control system 850. The processing and translation of motion controller signals remains consistent from drive to drive due to the configurable front end 858 of the re-configurable drive 106.

Figure 5:
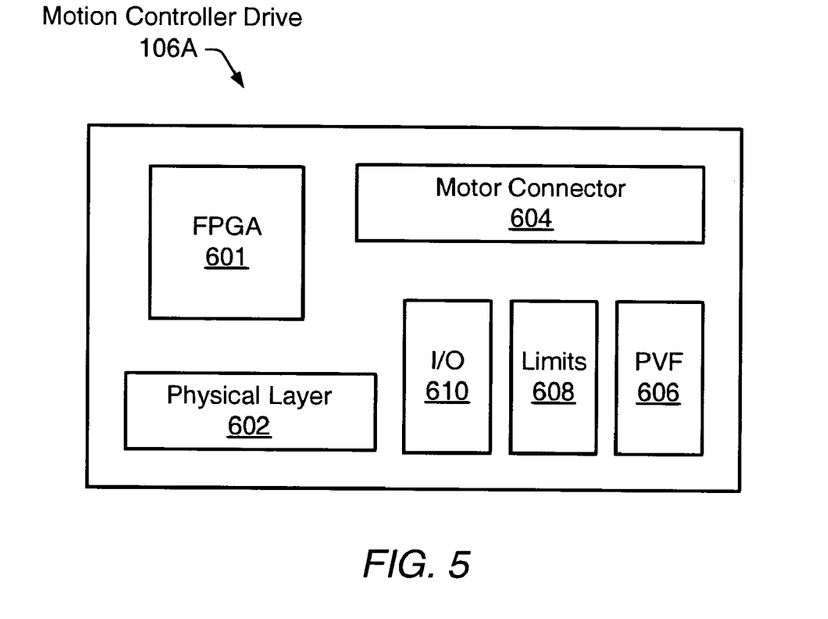
FIG. 5 illustrates a motion controller drive that may be used in the motion controller system of FIG. 2.

FIG. 5 illustrates a motion controller drive 106A that may be used in the motion controller system 100. The motion controller drive 106A may include a Field Programmable Gate Array (FPGA) 601. One embodiment of the invention comprises configuring the FPGA 601 to operate with the motion controller 105 of the motion control system 100. In another embodiment, the motion controller drive 106A may include another type of functional unit instead of or in addition to an FPGA. For example, the motion controller drive 106A may include another type of programmable or configurable device which may be configured to operate according to commands from the motion controller 105. Also, in one embodiment trajectory generation, interpolation, and control algorithms may be executed in the motion controller drive 106A, but not all being executed by the same device. For example, the motion control drive 106A may include a plurality of FPGAs, where each FPGA executes one or more of the algorithms.

The motion controller drive 106A includes a physical layer 602 for high speed deterministic serial network communications with the FPGA 601. A motor connector 604 is also included for communications with a motor such as the motor 108. A position/velocity feedback (PVF) component 606 is included to monitor actual movement in the motor and make appropriate adjustments in the motion controller drive 106A. Also included are limits 608 which define the end of travel for the motor. Finally, the motion controller drive 106A includes an auxiliary I/O component 610 for standard motion controller drive 106A operations.

Figure 6:
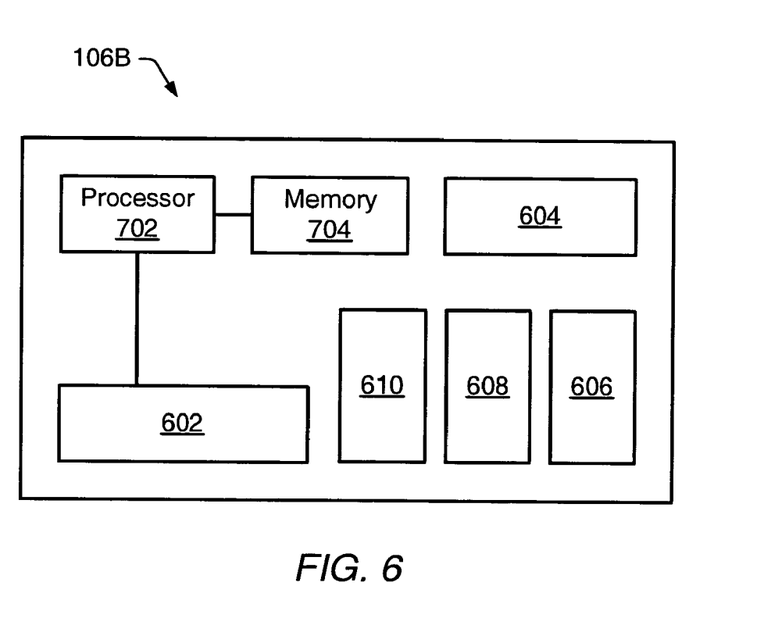
FIG. 6 illustrates another motion controller drive that may be used in the motion controller system of FIG. 2.

FIG. 6 illustrates another motion controller drive 106B that may be used in the motion controller system 100. In the motion controller drive 106B, a single processor 702 and memory 704 are illustrated to replace the FPGA 601 of the motion controller drive 106A and to accompany the other components of the motion controller drive 106A. Similar to the motion controller drive 106A, the motion controller drive 106B includes a physical layer 602 for high speed deterministic serial network communications with the processor 702. A motor connector 604 is also included for communications with a motor such as the motor 108. A position/velocity feedback component 606 is included to monitor actual movement in the motor and make appropriate adjustments in the motion controller drive 106B. Also included are limits 608 which define the end of travel for the motor. Finally, the motion controller drive 106B includes an auxiliary I/O component 610 for standard motion controller drive 106B operations.

Although a single processor 702 and memory 704 are illustrated in place of the FPGA 601, in another embodiment, the motion controller drive 106B may include a plurality of processors and one or more memories. Program instructions implementing trajectory generation, interpolation, and control algorithms may be stored in the one or more memories such that the plurality of processors can execute the algorithms in parallel. In another embodiment, the motion control drive 106B may include one or more FPGAs as well as one or more processors and one or more memories. Thus, the algorithms may be executed in parallel by a combination of FPGAs and processors.

Figure 7:
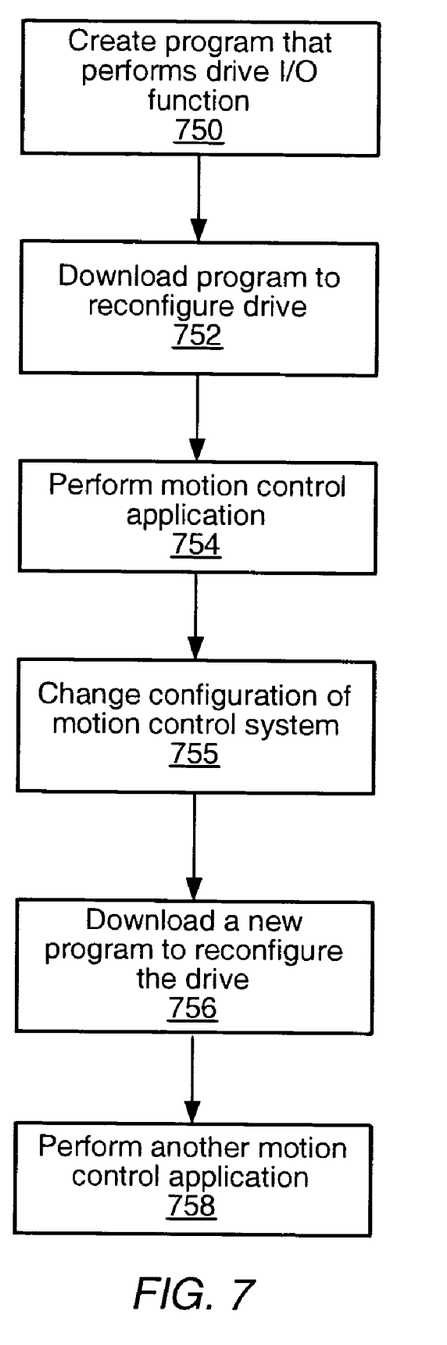
FIG. 7 is a flow diagram illustrating steps that may be taken while using a motion controller system constructed according to certain but not other aspects of the present invention.

FIG. 7 is a flow diagram illustrating steps that may be taken while using a motion controller system such as the motion controller system 100.

In 750, a program is created that performs I/O functions for the motion controller drive 106. In other words, the program may implement a motion controller communication protocol that allows a motion controller to communicate with a motion controller drive. The program may be created in a text-based programming language, or may be a graphical program created in a graphical programming language.

In 752, the program is downloaded to the motion controller drive 106 such that the motion controller drive 106 is re-configured. In other words, the program is downloaded to the motion controller drive 106 and used to configure a reconfigurable portion of the motion controller drive 106, thereby enabling the motion controller drive 106 to communicate using a desired motion controller communication protocol. The program may be a software program that is stored in the memory of the motion controller drive 106 and executable by a processor in the motion controller drive 106 (FIG. 6), or the program may comprise a hardware configuration program that configures a programmable hardware element in the motion controller drive 106 (FIG. 5). The program may be downloaded by a motion controller 105, or may be downloaded by a separate server coupled to the motion controller drive 106 over a network.

After the program has been downloaded to the motion controller drive 106, and the motion controller drive 106 has been re-configured based on the downloaded program, the motion controller drive 106 is then able to communicate according to the respective motion controller communication protocol. Thus the motion controller 105 is now able to communicate with the motion controller drive 106 according to the motion controller communication protocol. Then, in 754 the motion controller 105 performs a motion control application with the motion controller drive 106.

At a later time, in 755 a user may change the configuration of the motion control system. For example, the motion controller 105 may be replaced with a new motion controller that utilizes a different motion controller communication protocol. Alternatively, the motion controller drive 106 may be disconnected from the current motion controller and coupled to a new motion controller that utilizes a different motion controller communication protocol. In either case, it may then be desirable to reconfigure the motion controller drive 106 according to this new or different motion controller communication protocol.

In response to the change in configuration in 755, in 756 a new program may be downloaded to the motion controller drive 106. As noted above, the new program may be downloaded by a motion controller (e.g., the new motion controller), or may be downloaded by a separate server coupled to the motion controller drive 106 over a network. The motion controller drive 106 is thus re-configured based on the new downloaded program to communicate according to the new or different motion controller communication protocol. After the new program has been downloaded, and the motion controller drive 106 has been reconfigured, another motion control application may then be performed 758.

The above operations may repeat one or more times, and thus the motion controller drive 106 may be reconfigured as needed to communicate according to any of various motion controller communication protocols.

Numerous variations and modifications will become apparent to those skilled in the art once the above disclosure is fully appreciated. It is intended that the following claims be interpreted to embrace all such variations and modifications.

What is claimed is:

1. A method for configuring a motion controller drive in a system comprising a motion controller coupled through a digital communication link to the motion controller drive, the method comprising:
    downloading a first program to the motion controller drive, wherein the first program is operable to configure a reconfigurable portion of the motion controller drive according to a first motion controller communication protocol;
    a first motion controller communicating with the motion controller drive according to the first motion controller communication protocol;
    downloading a second program to the reconfigurable portion of the motion controller drive, wherein the second program is operable to configure the reconfigurable portion of the motion controller drive according to a second motion controller communication protocol;
    a second motion controller communicating with the motion controller drive according to the second motion controller communication protocol.

2. The method of claim 1 wherein the motion controller drive includes field programmable arrays (FPGAs) that may be programmed to communicate with different motion controllers.

3. The method of claim 1 wherein the motion controller drive includes at least one processor that may be programmed to communication with different motion controllers.

4. The method of claim 1 wherein the motion controller drive performs processing of communication signals from the first motion controller.

5. The method of claim 1 wherein the motion controller drive performs translation of communication signals from the first motion controller.

6. The method of claim 1 wherein the first motion controller is a software motion controller.

7. The method of claim 1 wherein a host communicates with the first motion controller via ethernet to control a device across the digital communication link.

8. The method of claim 1 wherein the motion controller drive receives feedback from a controlled device.

9. A method for configuring a motion controller drive in a system comprising a first motion controller coupled through a digital communication link to the motion controller drive, wherein the motion controller drive comprises a reconfigurable portion, the method comprising:
    downloading a first program to the motion controller drive, wherein the first program corresponds to a first motion controller communication protocol, wherein the first program is operable to configure the reconfigurable portion of the motion controller drive according to the first motion controller communication protocol;
    the first motion controller generating first communication signals onto the digital communication link, wherein the first communication signals comply with the first motion controller communication protocol;
    the motion controller drive receiving the first communication signals;
    the reconfigurable portion of the motion controller drive executing the first program to process the first communication signals, wherein the motion controller drive is operable to control a motor in response to said executing the first program;
    downloading a second program to the reconfigurable portion of the motion controller drive, wherein the second program corresponds to a second motion controller's communication protocol, wherein the second program is operable to configure the reconfigurable portion of the motion controller drive according to the second motion controller communication protocol;
    the second motion controller generating second communication signals onto the digital communication link, wherein the second communication signals comply with the second motion controller communication protocol;
    the motion controller drive receiving the second communication signals;
    the reconfigurable portion of the motion controller drive executing the second program to process the second communication signals, wherein the motion controller drive is operable to control a motor in response to said executing.

10. The method of claim 9 wherein the motion controller drive includes field programmable arrays (FPGAs) that may be programmed to communicate with different motion controllers.

11. The method of claim 9 wherein the motion controller drive includes at least one processor that may be programmed to communicate with different motion controllers.

12. The method of claim 9 wherein the motion controller drive performs processing of communication signals from the first motion controller during a first time period and performs processing of communication signals from the second motion controller during a second time period.

13. The method of claim 9 wherein the motion controller drive performs translation of communication signals from the first motion controller.

14. The method of claim 9 wherein the first motion controller is a software motion controller.

15. The method of claim 9 wherein a host communicates with the first motion controller via ethernet to control a device across the digital communication link.

16. The method of claim 9 wherein the motion controller drive receives feedback from a controlled device.

17. A method for configuring a motion controller drive in a system comprising a motion controller coupled through a digital communication link to the motion controller drive, the method comprising:

a motion controller communicating signals to the motion controller drive, wherein the motion controller generates signals according to a first motion controller communication protocol;

determining if the motion controller drive can understand the first motion controller communication protocol;

if the motion controller drive cannot understand the first motion controller communication protocol, then downloading a first program to a reconfigurable portion of the motion controller drive, wherein the first program is executable to enable the motion controller drive to understand the first motion controller communication protocol.

18. The method of claim 17 further comprising downloading from a server on a network a second program, wherein the second program is operable to configure the reconfigurable portion of the motion controller drive according to a second motion controller communication protocol.

19. The method of claim 18 wherein a second motion controller generates second communication signals onto the digital communication link, wherein the second communication signals comply with a second motion controller communication protocol;

the motion controller drive receiving the second communication signals;

the reconfigurable portion of the motion controller drive executing the second program to process the second communication signals, wherein the motion controller drive is operable to control a motor in response to said executing.

20. A method for configuring a motion controller drive in a system comprising a motion controller coupled through a digital communication link to the motion controller drive, the method comprising:

coupling the motion controller drive to a motion controller, wherein the motion controller operates according to a first motion controller communication protocol, wherein the motion controller drive is configured to operate according to a second motion controller communication protocol;

the motion controller downloading a first program to a reconfigurable portion of the motion controller drive, wherein the first program configures the reconfigurable portion to operate according to the first motion controller communication protocol.

21. The method of claim 20 wherein the motion controller and the motion controller drive communicate according to the first motion controller communication protocol.

22. The method of claim 20 further comprising coupling a second motion controller drive to the motion controller, wherein the second motion controller drive operates according to the second motion controller communication protocol;

the motion controller downloading the first program to a reconfigurable portion of the second motion controller drive, wherein the first program configures the reconfigurable portion of the second motion controller drive to operate according to the first motion controller communication protocol.

23. A method for configuring a motion controller drive in a system comprising a first motion controller coupled through a digital communication link to the motion controller drive, wherein the motion controller drive comprises a reconfigurable portion, wherein the motion controller drive is configured with a first program to operate according to a first motion controller communication protocol, the method comprising:

downloading a second program to the reconfigurable portion of the motion controller drive, wherein the second program corresponds to a second motion controller, wherein the second program is operable to configure the reconfigurable portion of the motion controller drive according to a second motion controller communication protocol;

the second motion controller generating second communication signals onto the digital communication link, wherein the second communication signals comply with a second motion controller communication protocol;

the motion controller drive receiving the second communication signals;

the reconfigurable portion of the motion controller drive executing the second program to process the second communication signals, wherein the motion controller drive is operable to control a motor in response to said executing.

24. The method of claim 23 wherein prior to said downloading the second program the method comprises:

downloading the first program to the motion controller drive, wherein the first program corresponds to the first motion controller, wherein the first program is operable to configure the reconfigurable portion of the motion controller drive according to the first motion controller communication protocol;

the first motion controller generating first communication signals onto the digital communication link, wherein the first communication signals comply with the first motion controller communication protocol;

the motion controller drive receiving the first communication signals;

the reconfigurable portion of the motion controller drive executing the first program to process the first communication signals, wherein the motion controller drive is operable to control a motor in response to said executing the first program.

25. A motion controller drive, comprising:

an input for receiving communication signals from a motion controller, wherein the communication signals correspond to a respective motion controller communication protocol;

a reconfigurable portion coupled to the input, wherein the reconfigurable portion is configured to process received communication signals according to a first motion controller communication protocol during a first period of time and is reconfigurable to process received communication signals according to a second motion controller communication protocol during a second period of time;

drive logic coupled to the reconfigurable portion, wherein the drive logic is operable to control a motor in response to signals received from the reconfigurable portion.

26. The motion controller drive of claim 25 wherein the reconfigurable portion comprises a programmable hardware element.

27. The motion controller drive of claim 25 wherein the reconfigurable portion comprises a processor and memory medium.

28. The motion controller drive of claim 25 wherein the motion controller drive is reconfigurable to operate with different motion controllers using different motion controller communication protocols.

* * * * *